US007131791B2

(12) United States Patent
Whittaker et al.

(10) Patent No.: US 7,131,791 B2
(45) Date of Patent: Nov. 7, 2006

(54) PIPELINE REHABILITATION SYSTEMS

(75) Inventors: William Lawrence Whittaker, Pittsburgh, PA (US); Adam Slifko, Pittsburgh, PA (US); Eric C. Close, Milford, CT (US)

(73) Assignee: RedZone Robotics, Inc., West Homestead, PA (US)

( * ) Notice: Subject to any disclaimer, the term of this patent is extended or adjusted under 35 U.S.C. 154(b) by 0 days.

(21) Appl. No.: 10/713,545

(22) Filed: Nov. 13, 2003

(65) Prior Publication Data

US 2004/0175235 A1  Sep. 9, 2004

Related U.S. Application Data

(60) Provisional application No. 60/426,205, filed on Nov. 13, 2002, provisional application No. 60/427,990, filed on Nov. 20, 2002.

(51) Int. Cl.
*F16L 55/18* (2006.01)

(52) U.S. Cl. ............... 405/184.2; 405/184.1; 405/184.3; 405/156; 138/97

(58) Field of Classification Search ............. 405/154.1, 405/155, 183.5, 184.1–4; 138/97, 98; 166/55.6–8
See application file for complete search history.

(56) References Cited

U.S. PATENT DOCUMENTS

| | | |
|---|---|---|
| 3,562,642 A | 2/1971 | Hochschild |
| 3,672,785 A | 6/1972 | Byrne |
| 4,029,428 A | 6/1977 | Levens |
| 4,197,908 A | 4/1980 | Davis et al. |
| 4,431,017 A | 2/1984 | Willemsen |
| 4,437,526 A | 3/1984 | Gloor |
| 4,442,891 A | 4/1984 | Wood |
| 4,577,388 A | 3/1986 | Wood |
| 4,613,812 A | 9/1986 | Gelston, II |
| 4,630,676 A | 12/1986 | Long, Jr. |
| 4,648,454 A | 3/1987 | Yarnell |
| 4,701,988 A | 10/1987 | Wood |
| 4,724,108 A * | 2/1988 | Jurgenlohmann et al. ..... 138/97 |
| 4,765,173 A | 8/1988 | Schellstede |
| 4,819,721 A | 4/1989 | Long, Jr. |
| 4,951,758 A | 8/1990 | Sonku et al. |
| 4,955,951 A | 9/1990 | Nemoto et al. |
| 5,018,545 A * | 5/1991 | Wells .......................... 134/113 |
| 5,044,824 A | 9/1991 | Long, Jr. et al. |
| 5,088,553 A | 2/1992 | Ralston et al. |

(Continued)

FOREIGN PATENT DOCUMENTS

EP        462527    * 12/1991

(Continued)

*Primary Examiner*—Frederick L. Lagman
(74) *Attorney, Agent, or Firm*—Reed Smith LLP

(57) ABSTRACT

Devices and methods for streamlining the completion of work functions within a lateral pipe connected to a main pipe. A variety of different lateral devices may be used to aid in the process of relining the main or lateral pipe. A lateral location device is inserted into the lateral pipe prior to relining of the main pipe and is subsequently used to aid in the conventional cutting of the main-lateral interface. A lateral cutting device actually performs the main-lateral cutting process from within the lateral or from within the main. A lateral inspection device crawls up the lateral for inspection via camera. A lateral relining device aids in the placement of a liner used to reline the lateral pipe. Each of these interchangeable work functions may be optional performed by one or more lateral devices, often carried and inserted by a delivery device.

19 Claims, 16 Drawing Sheets

U.S. PATENT DOCUMENTS

| | | | |
|---|---|---|---|
| 5,105,882 A | 4/1992 | Ralston et al. | |
| 5,150,989 A | 9/1992 | Long, Jr. et al. | |
| 5,197,540 A * | 3/1993 | Yagi et al. | 166/55.8 |
| 5,318,395 A * | 6/1994 | Driver | 409/132 |
| 5,520,569 A * | 5/1996 | Endoh | 451/5 |
| 5,577,864 A * | 11/1996 | Wood et al. | 405/184.2 |
| 5,700,110 A * | 12/1997 | Kamiyama et al. | 405/184.2 |
| 5,960,882 A * | 10/1999 | Polivka | 166/55.7 |
| 5,975,878 A * | 11/1999 | Wood et al. | 425/503 |
| 5,992,247 A * | 11/1999 | Manestar | 73/865.8 |
| 6,026,911 A * | 2/2000 | Angle et al. | 175/24 |
| 6,039,079 A * | 3/2000 | Kiest, Jr. | 138/98 |
| 6,068,725 A * | 5/2000 | Tweedie et al. | 138/97 |
| 6,082,411 A * | 7/2000 | Ward | 138/98 |
| 6,378,627 B1 * | 4/2002 | Tubel et al. | 175/24 |
| 6,386,797 B1 * | 5/2002 | Gearhart | 405/184.3 |
| 6,431,270 B1 * | 8/2002 | Angle | 166/66.5 |
| 6,695,013 B1 * | 2/2004 | Warren | 138/98 |
| 6,843,317 B1 * | 1/2005 | Mackenzie | 166/254.2 |
| 6,887,014 B1 * | 5/2005 | Holland | 405/184.1 |
| 2004/0055746 A1 * | 3/2004 | Ross et al. | 166/250.15 |

FOREIGN PATENT DOCUMENTS

JP       10286878       * 10/1998

* cited by examiner

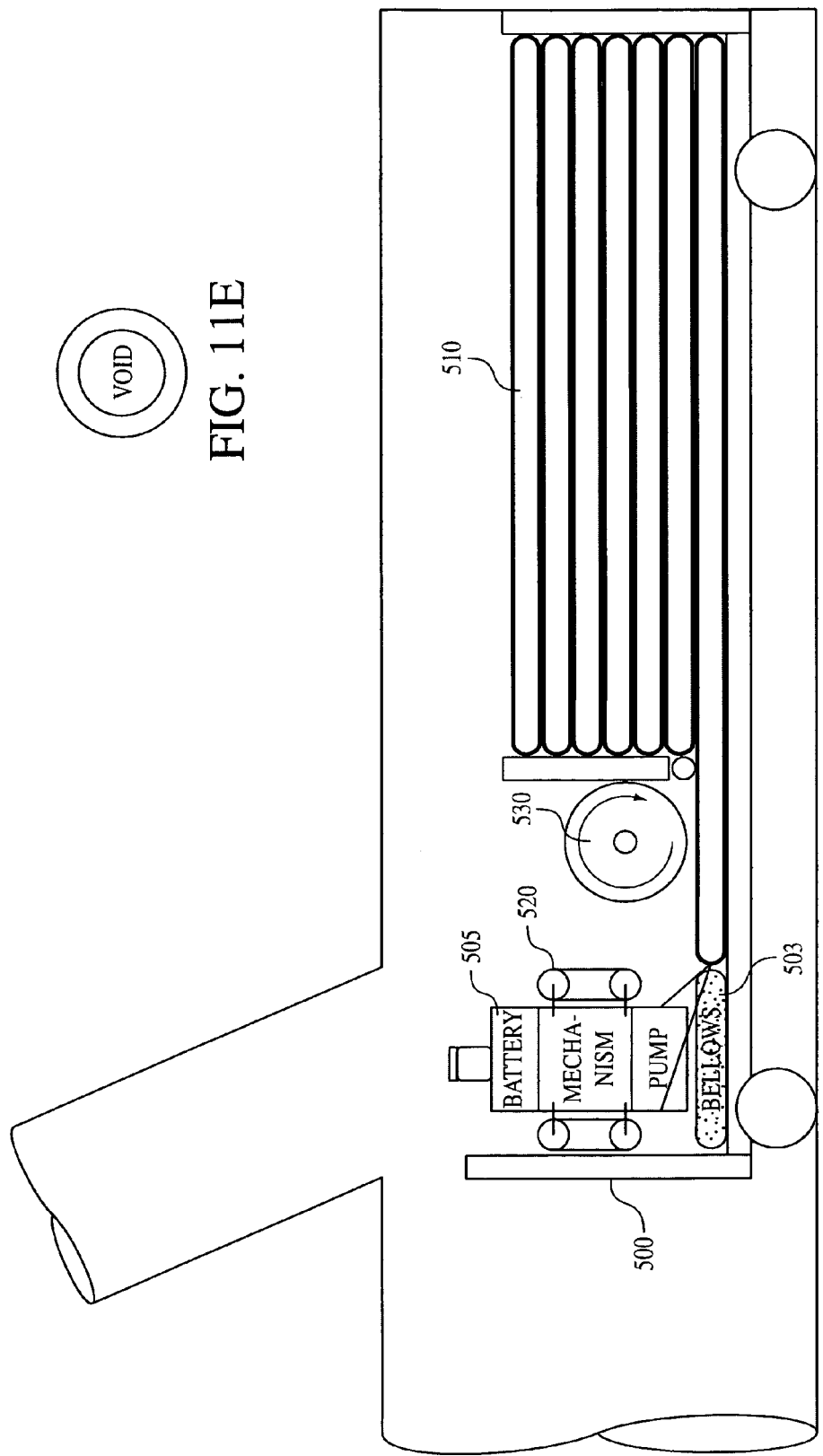

"TOP" FELT END

"BOTTOM" FELT END-LATERAL END

PIPELINE REHABILITATION SYSTEMS

CLAIM OF PRIORITY

The present patent application claims priority to U.S. Provisional Patent Application No. 60/426,205 filed on Nov. 13, 2002 and U.S. Provisional Patent Application No. 60/427,990 filed on Nov. 20, 2002.

BACKGROUND OF THE INVENTION

1. Field of the Invention

The present invention relates generally to systems and methods for pipeline rehabilitation, and, more specifically, the present invention relates to devices used to cut or assist in the cutting of lateral openings in a main pipeline after a relining process.

2. Description of the Background

Various pipeline networks are used in a variety of different technological disciplines. For example, largely subterranean potable water pipeline networks deliver clean water to homes and businesses and sewer pipeline networks guide used water and wastes away from these same locations for further treatment or disposal. In general, pipeline networks are used to guide an almost limitless variety of liquids and gases from one location to another, either under pressure or by the force of gravity.

A section of a conventional pipeline network for subterranean sewers is shown in FIG. 1. FIG. 1A shows an isometric view of the pipeline network, and FIGS. 1B and 1C show front (down the longitudinal axis) and side views, respectively. As seen in FIG. 1, a main line 10 typically traverses in a longitudinal direction with a variety of different lateral lines 12, 14 intersecting the main 10 at various locations. The lateral connections with the main 10 occur at various angles in planes co-linear with the longitudinal axis (FIG. 1C) and perpendicular to the longitudinal axis (FIG. 1B). A lateral typically may intersect with the main 10 at any angle within the upper hemisphere of the main.

The pipeline network also includes a plurality of surface manholes (not shown) that provide access to the subterranean pipeline network at various locations. For sewer pipelines, a distance of 300 feet between successive manhole access points is common. These access points intersect with the main as vertically intersecting laterals.

After years of wear, the walls of the pipelines begin to crack, leak and generally deteriorate, and this wear may adversely affect use of the pipe. As such, various processes have been developed to rehabilitate these pipelines and provide for a longer service life. One common rehabilitation method involves relining the interior walls of pipes with an epoxy or resin-impregnated felt liner that is prefabricated and rolled in the form of a rolled-up sock (i.e., one end open and one end closed). The liner is fed down through a manhole access point and is guided into the pipeline main. Pressurized water is then forced into the open end of the rolled liner forcing it to unroll and unfurl down the length of the main. The far end of the liner is tied off or closed to allow for the expansion of the felt liner against the inside of the pipe wall.

The relining process is typically performed on pipes that have been prepared for relining by removing serious flaws, such as collapses and extensive debris. In these cases, a machine or other means, depending on the size of the pipe, is used to assess and repair the main and/or lateral (extending to a house or building) before relining.

After unrolling, the felt liner, often referred to as Cured In Place Pipe (CIPP), is filled with pressurized heated water and is allowed to cure for several hours depending on the CIPP length, thickness and other relining factors. For an 8" sewer main, a typical cure time may be three hours. After curing, the closed end of the liner is cut open allowing the water to proceed down the main out of the liner. The result is a relined, and hence rehabilitated, pipe that lasts for up to 50 more years with regular maintenance. This process is obviously much cheaper than excavating and replacing the mains of subterranean pipe networks.

At this point, each of the lateral connections with the main is now covered over with the cured epoxy lining. Therefore, to restore service to the houses and other buildings connected to the main through the laterals, new openings in the Cured In Place Pipe must be cut at each lateral connection. Typically, for smaller pipes that do not allow for man-entry within the mains for cutting (e.g., smaller than 24" in diameter), a small tele-operated machine is used to cut the laterals open after curing. The machine includes an air-powered routing bit with three axes of manipulation that is tele-operated from the surface. Via tele-operation, the cutting machine is positioned in front of a lateral.

To accomplish the lateral cutting task using conventional methods, the operator uses a camera view from an inspection sled which is being towed directly in front of the lateral cutting machine which provides a perspective view of the cutting operation. Typically, a conventional video feed is used for tele-operation of the machine. The operator (at the surface) uses the analog video image to look for a "dimple" or depression in the newly cured liner caused by the pressurized water indenting the soft felt liner at the location of most laterals. In some cases, a lateral may not cause a dimple in the liner. In these cases, a pay-out sensor may be used to generally identify the location of each lateral prior to lining, and the lateral cutting machine may be stopped at each of the recorded locations after lining and attempt to drill or punch a lateral hole at each of these locations. In either case, the conventional method lacks a great deal of precision.

Once the lateral locations are found, the operator uses his camera view to punch through the lined lateral and relieve any backpressure in the lateral pipe (e.g., so that waste water does not back up all the way into the house or building). Then, the operator must re-cut the opening of the lateral to some predefined standard (e.g., 90–95% of the original diameter of the main-lateral interconnection). Further, it is important that the cutting step not leave a ledge at the lower portion of the lateral as such a ledge would provide a collection point for waste and other materials that may come down the lateral in the future.

In all, conventional lateral cutting machines, even with an experienced operator, take approximately 30 minutes to cut each lateral open after relining. This process is performed serially, one lateral at a time. In a typical 300 foot sewer run, there may be 15 laterals which would take 7½ hours to cut. This, combined with the setup, inspection and breakdown time, can total over 9 hours just to reestablish service to a single section of main sewer pipes. Even if the relined pipe lasts for 50–70 years as projected, upkeep on the millions of miles of underground sewer and potable water pipe in this country would be beyond the scope of conventional methods.

Although shown and described herein with respect to sewer pipelines, the present invention could also be used in other industries, such as general industrial, water, gas, or chemical pipes. Those skilled in the art can easily adapt the features of the present invention to these and other pipeline networks.

SUMMARY OF THE INVENTION

In accordance with at least one preferred embodiment, the present invention pertains to devices that facilitate the quicker, easier and more efficient cutting of laterals to reestablish connection with the main pipeline after relining. Generally speaking, one of several classes of "lateral devices" is inserted into the laterals before relining in order to assist with or accomplish the lateral opening after relining. Furthermore, a machine or robot herein referred to as a "delivery device" is used for the delivery and insertion of these lateral devices into the lateral at the proper intersection angle (FIG. 1C) and clocking position (FIG. 1B).

A first class of lateral devices is known as "lateral location devices." The lateral location devices are inserted into each lateral before relining, and, after curing of the liner, are activated to assist a conventional cutting machine to open each lateral. These lateral location devices are preferably autonomous robots and are not tele-operated machines.

A second class of lateral devices is known as "lateral cutting devices." The lateral cutting devices are inserted into each lateral before relining, and, after curing of the liner, are activated to actually cut through and open each lateral. These lateral cutting devices are preferably autonomous robots, but in some embodiments may also be tele-operated from the surface side of the lateral.

The delivery device for delivering and inserting the lateral devices may be self-propelled or pulled as a sled-type device as is common in the pipeline arts. These delivery devices preferably provide a means for moving one or more lateral devices back and forth throughout the main pipeline.

The delivery device preferably also includes an insertion mechanism thereon in order to position and insert one or more lateral devices into a lateral prior to relining. Nominally, the delivery device may carry enough lateral devices to complete the lateral cutting for a 300 foot long, typical relining project. The lateral devices may be housed in a sleeve or daisy-chained together to facilitate loading into the insertion mechanism. For example, the sleeve may be spring-loaded or actuated with an inflatable bellows or bag such that it would provide a "pushing" force to incrementally feed the lateral devices to the head of the insertion mechanism where the lateral device may be inserted.

The insertion mechanism on the delivery device preferably includes several axes of motion that allow the placement of the lateral devices into the lateral. The first axis of motion revolves around the inner surface of the main pipeline, akin to the hands of a clock rotating around the longitudinal axis (see FIG. 1B). A second axis of motion is a pivot axis to allow the insertion mechanism to swing away from the longitudinal pipe axis by at least 90 degrees. A full 180-degree swing is desirable such that the insertion mechanism can accommodate laterals that angle up stream or down stream (see FIG. 1C). A third axis of motion is an extension of the insertion mechanism to actually place the lateral device within a lateral prior to relining. This insertion mechanism may be a pneumatic cylinder, inflatable bellows, scissors mechanism, ball screw, mechanical bellows, collapsible chain, or a bag that extends within a containment tube as air is pumped therethrough. A powerful stroke in a compact device is preferred.

In the design of the delivery device, these three axes are sufficient for retrieving a lateral device from the storage sleeve or sled as needed. For example, the end of the insertion mechanism may have a grasping jaw to grab and hold the lateral device securely while positioning it for insertion. Alternatively, the grasping device may be electromagnetic and require only contact with a metal surface on the lateral device to pull and guide it into the insertion mechanism. When energized, this electromagnet selects and holds the lateral device, and later releases the device within the lateral upon de-energizing. With on-board computing or on-board sensing and off-board computing, the process may be fully automated for the placement of a series of lateral devices.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

The present invention, in at least one preferred embodiment, provides devices and methods that streamline the pipeline rehabilitation process, especially the lateral location and cutting processes after relining. Several examples of various devices (collectively "lateral devices") that may be inserted into the lateral prior to relining may be used within the teachings of this invention, and this description is for exemplary purposes only. The lateral devices include, for example, lateral cutting devices, lateral location devices, and the like.

Lateral Location Devices

A first embodiment of the present invention is the illuminated lateral location device. Generally speaking, this device is inserted into each lateral by a delivery device (described below) prior to the relining process. The illuminated lateral location device secures itself within the lateral and shines a visible light or other electromagnetic signal down towards the main. After relining, the light shines through the newly installed lining (which is opaque to the visible light or the electromagnetic wave) such that the operator of a conventional lateral cutting machine will see the exact size, shape and orientation of each lateral prior to cutting. Guided by the light, the tele-operated cutting process time will be decreased and cutting accuracy will be improved.

Figure 1A:
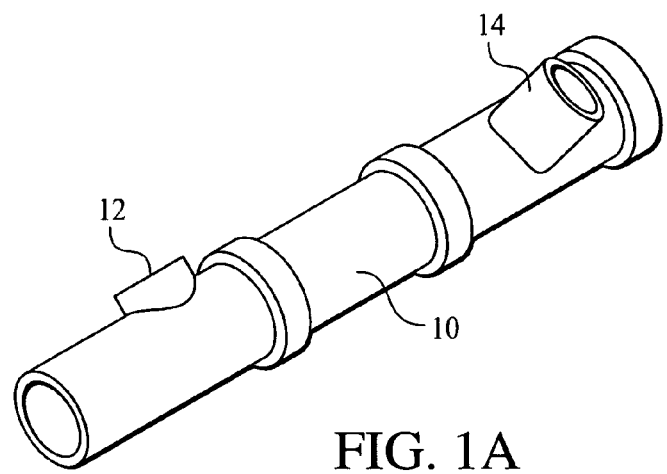
FIG. 1 shows a typical subterranean sewer pipeline network in isometric (FIG. 1A), front (FIG. 1B) and side (FIG. 1C) views.
Figure 1B:
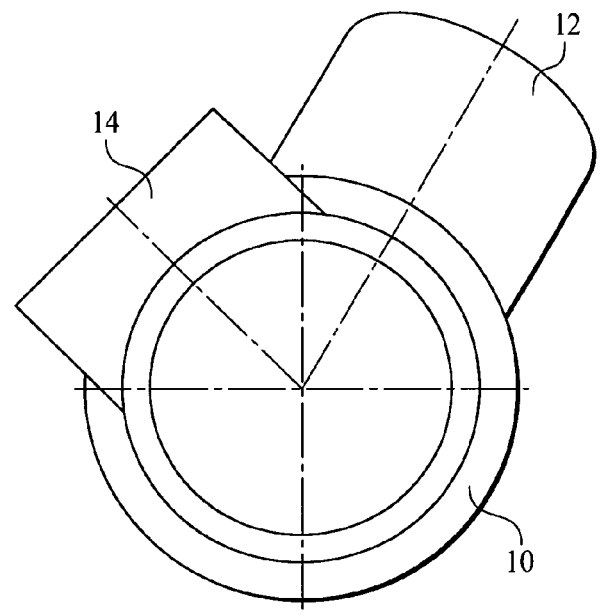
Figure 1C:
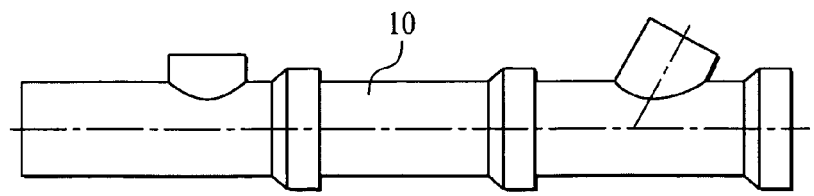

In more detail, the complicated nature of the cutting process is caused by the nature of the lateral-main intersection. Because it is the intersection of two cylindrical pipes, the actual intersection is "saddle-shaped" and not circular. Further, because each lateral intersects the main at a different angle (both around the main and with respect to the main as shown in FIG. 1), the actual shape of the intersection varies widely across different laterals. However, given the clearly illuminated view provided by the lateral location device, the operator's cutting task is greatly facilitated.

Figure 2A:
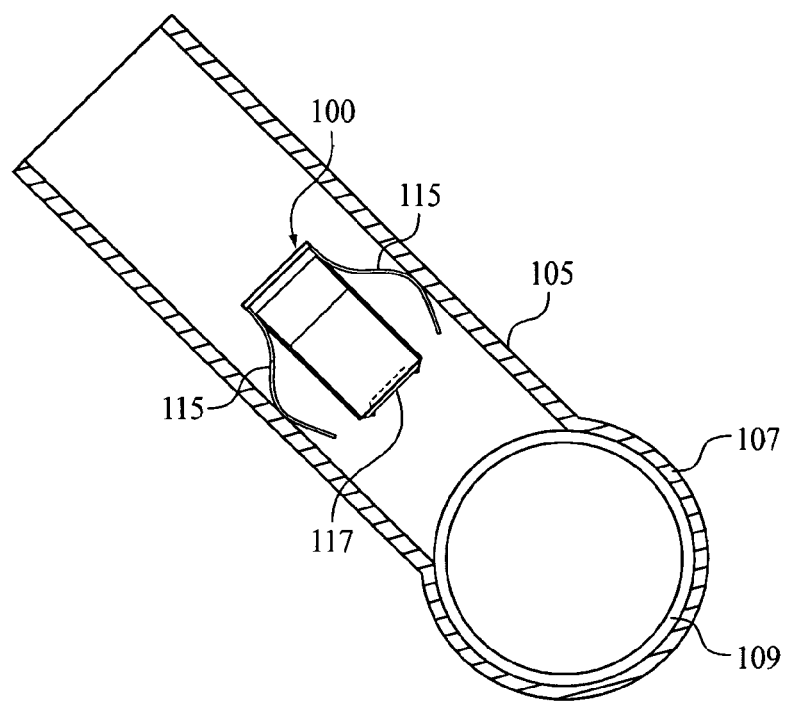
FIG. 2 depicts one embodiment of a lateral location device in side view (FIG. 2A) and front view (FIG. 2B)
Figure 2B:
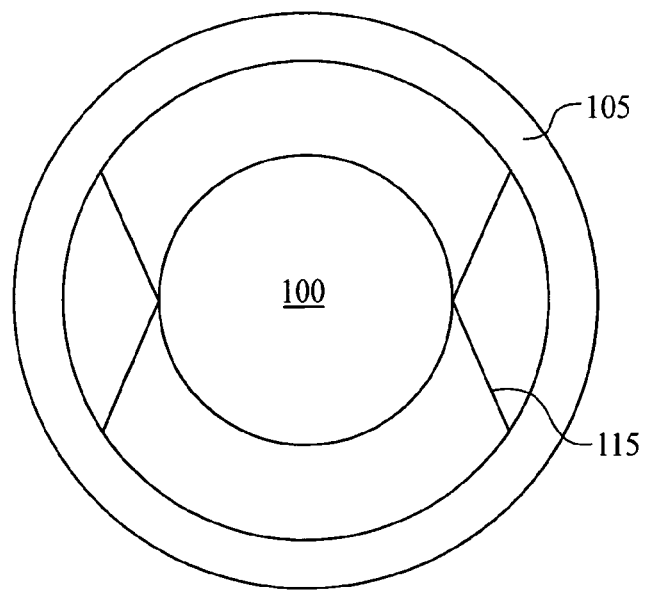

FIGS. 2A and 2B shows one presently preferred embodiment of the illuminated lateral location device 100 as installed into a lateral pipe 105 facing a main 107 just after relining 109. Note that before cutting, the liner 109 completely blocks the intersection between the lateral 105 and the main 107. The lateral location device 100 preferably includes one or more anchor supports 115 to keep the device 100 secured within the lateral 105 during the relining process. The illuminated device 100 also includes a power source, such as a battery, and a light 117 or other signal source to facilitate lateral cutting. The illumination may be made with a standard incandescent bulb or laser, or more preferably by a long life, low power LED(s).

There are several ways in which the lateral location device 100 may secure itself within the lateral pipe 105 after insertion. For example, the device may include an inflatable air bag or spring loaded "feet" (shown as 115) that bias the device against the surface of the lateral walls 105 according to conventional mechanical engineering practices. The biasing device 115 may be actively switched on/off by the delivery device, or there may be a passive spring or uncoiling of the device as it is pushed up into the lateral. The holding or biasing device 115 need only support the weight of the illuminated lateral location device 100 within the lateral 105 during relining and cutting.

The lateral location device 100 may be inserted into the lateral the day before lining (to improve overall lining efficiency for multiple projects) so the lateral device preferably does not block the entire diameter of the lateral in which it sits. In other words, when viewing the lateral 105 with the lateral location device 100 therein from the main 107 (FIG. 2B), there would be some space 120 around the sides of the lateral device 100. This space 120 allows normal use of the lateral 105 before relining so that service to the houses and/or buildings connected through the lateral is not disrupted.

Figure 3:
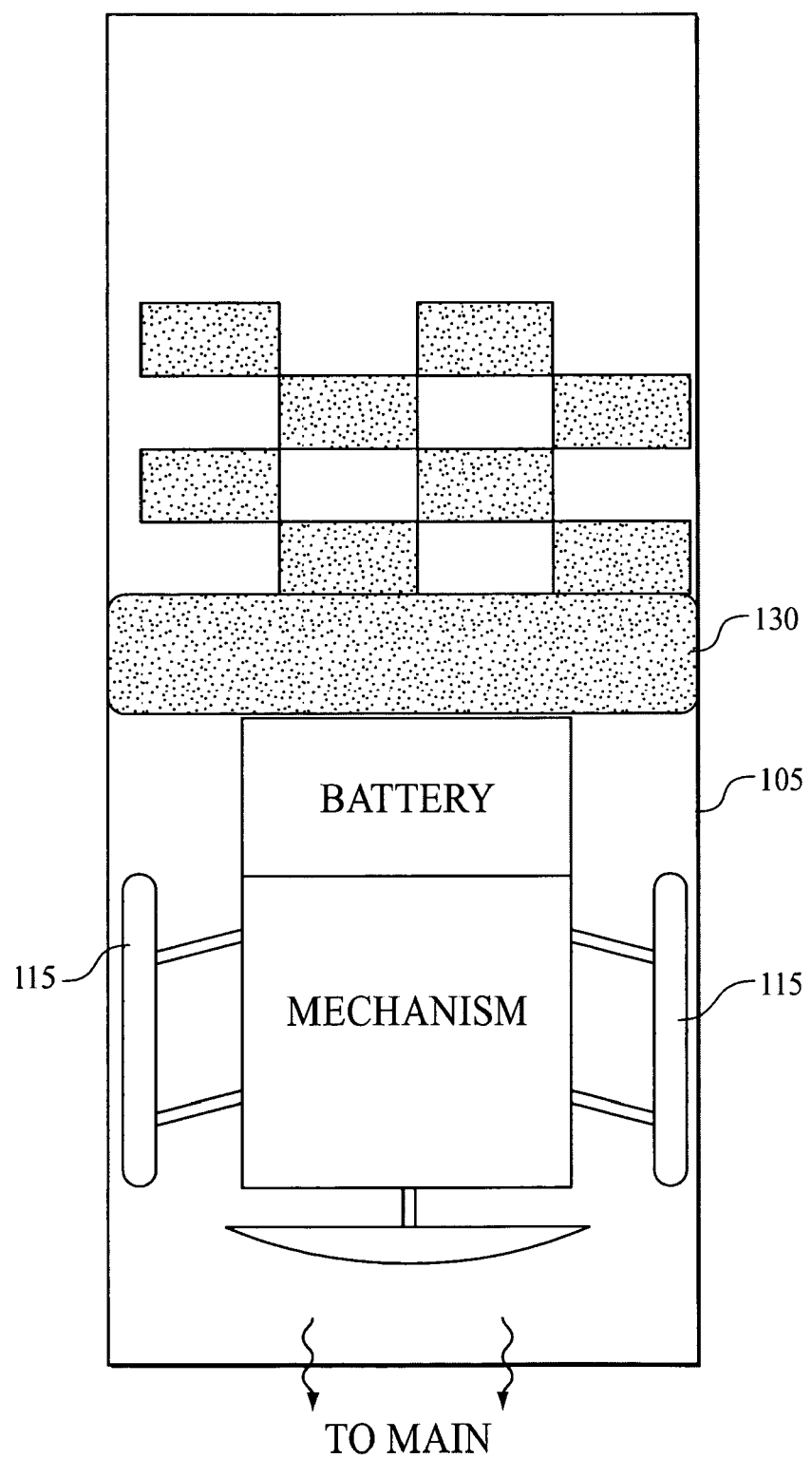
FIG. 3 depicts a lateral device with a porous or non-porous debris seal on the surface side.

Alternatively, there could be a screen or partial plug on the lateral device to block solid wastes from entering the main but allowing liquid wastes to pass through. In some embodiments (FIG. 3), a full plug 130, completely shutting off access to the main from the lateral, may also be preferred. If the full plug 130 is on the "surface-side" of the lateral location device 100 as in FIG. 3, water and other wastes are kept away from the main during relining.

In some relining operations, the felt liner may not be opaque. In these applications, the "light" 117 of the lateral location device 100 can be replaced with other technologies. For example, radio waves, x-rays, or any other electromagnetic signal may be used according to traditional practices. The only requirement is that the cutting machine, used by the operator via tele-operation to cut open the lateral after lining, must in some way be able to sense the signal and utilize this sensed signal to locate and cut the lateral (at least by communicating that a signal was sensed to the operator). An almost limitless variety of signals (visible, audible, and invisible, etc.) could be used within the scope of the present invention.

Another optional version of the present invention is to replace the battery or onboard power source with a tether. However, because the lining process covers the intersection between the lateral and the main, the tether preferably extends up the lateral and out of the non-main side of the lateral (i.e., the service side). This may be inconvenient for sewer applications, but it may be useful for other pipeline networks. The tether may provide communications and control to the lateral location device in addition to or as an alternative to providing power.

Another optional feature of the lateral location device is a switching mechanism to turn the light (or other signaling source) 117 on and off as necessary. For example, during the multi-hour curing process, there is no need for the light to illuminate. In effect, this is a waste of the onboard power. In its simplest form, the switching may just be a timer that switches on the light after a predetermined amount of time. For example, the average time for a cure may be programmed into the timer, and, at the time the lining should be cured and is ready for cutting, the light will illuminate. However, any delays during the relining process will result in wasted power.

In another embodiment, the switching may be activated based on proximity to the lateral cutting machine. For example, the lateral cutting machine may emit a signal every few seconds that, when sensed by the lateral location device within the lateral, causes the light to illuminate. Alternatively, the lateral location device may sense (e.g., via sonar) the proximity of the lateral cutting machine and illuminate (or turn on its other signaling capability). Many possibilities within the scope of the present invention will be evident to those skilled in the art.

In another embodiment, the lateral location device may include a video camera or other imaging device directed down toward the main pipe. In these embodiments, when the lateral cutting machine is used to punch the initial hole in the center of the liner at the lateral-main connection, a video image from within the lateral could be transmitted (e.g., by wireless link or tether) up to the operator guiding the lateral cutting machine via tele-operation. Therefore, in addition to or in place of the camera view from onboard the cutting machine (or onboard a sled in front of the cutting machine), the operator will also see the cutting tool from within the lateral. This lateral view will provide precise guidance to the operator for cutting. Further, because the cutting is being viewed from its opposite side, it may be useful to flip the video image so that the cut is more intuitive to the operator.

In some relining processes, the liner is shaped to extend partially up the lateral itself. In these applications, in addition to the main be relined, the first few feet of the lateral are also relined. Here, the end of the relined portion of the lateral will again result in a cover or cap that must be cut and removed to open the lateral. The various embodiments of the present invention are applicable to this cutting orientation as well, as long as the lateral location device is inserted or manipulated up into the lateral beyond the extent of the relining process. For example, once inserted, the lateral location device could "crawl" its way up the lateral on outward biased treads 150 (see, FIG. 4) or it could be pushed up with a wire, similar to an endoscope. Many different movement means are possible.

In still another alternative embodiment, the conventional lateral cutting machine may be adapted to include a light or other signal sensor to automatically sense and cut the liner at a lateral. For example, if bright LEDs were used to illuminate the lateral opening through an opaque liner, a light sensor on the lateral cutting machine could be used to follow the light and automatically cut out the lateral to a high degree of precision. Further refinement of the cut could be made with conventional sight guidance (via video), if necessary.

Another optional feature on the lateral devices is one or more temperature sensors to sense the temperature of the lining or the surrounding area. This temperature will aid in determining when a full cure has been achieved, and may further reduce the overall relining processing time by allowing the cutting step to proceed as soon as curing is achieved. The temperature sensor data may also be wirelessly transmitted up to an operator at the surface to adjust the temperature of the pressurized water during curing, when necessary, or to signal that illumination should occur.

As described above, each of the laterals could be cut in series using a conventional lateral cutting machine. However, multiple lateral cutting machines could also be used in parallel to achieve a plurality of cuts in a reduced amount of time. Additional operators may be necessary to perform cuts in parallel.

The sled or mobile delivery device, described in more detail below, preferably houses a plurality of lateral location devices and inserts each device into successive laterals as described above (e.g., jaws or electromagnets). Preferably, the delivery device is multi-functional, so that it also inspects, cleans, and rehabilitates the area of the main that is going to be relined before unfurling the liner. With interchangeable mechanisms, the delivery device is also used as the lateral cutting machine to cut the laterals. In this way, the delivery device can perform many of the required functions of the relining process. Further, if a successive section of the main is to be later relined, the delivery device may collect the lateral location devices out of the laterals after cutting, and then travel down to the next main pipeline section and begin the lateral insertion process again. If automated, this process could be continuous.

Lateral Cutting Devices

Alternative lateral devices that may greatly facilitate the opening of relined laterals are generally characterized as "lateral cutting devices." Although potentially also including the location functionality described above, the lateral cutting devices are characterized in that they have the ability to at least partially open the relined lateral from within the lateral pipe. Preferably, no traditional lateral cutting machine is needed, and all laterals can be cut simultaneously—resulting in a large time and cost savings over conventional practices.

As with the lateral location device, the lateral cutting device would be inserted and anchored into each lateral before the relining process. Depending on the lining used, the lateral cutting device would be inserted into the lateral or "crawl" up the lateral to a place just beyond where the relining occurs. Here, the lateral cutting device is anchored to the walls of the lateral in ways described above (e.g., spring compression or friction). After curing of the new liner, the lateral cutting device is signaled to cut through the relined lateral from within the lateral itself.

Figure 4A:
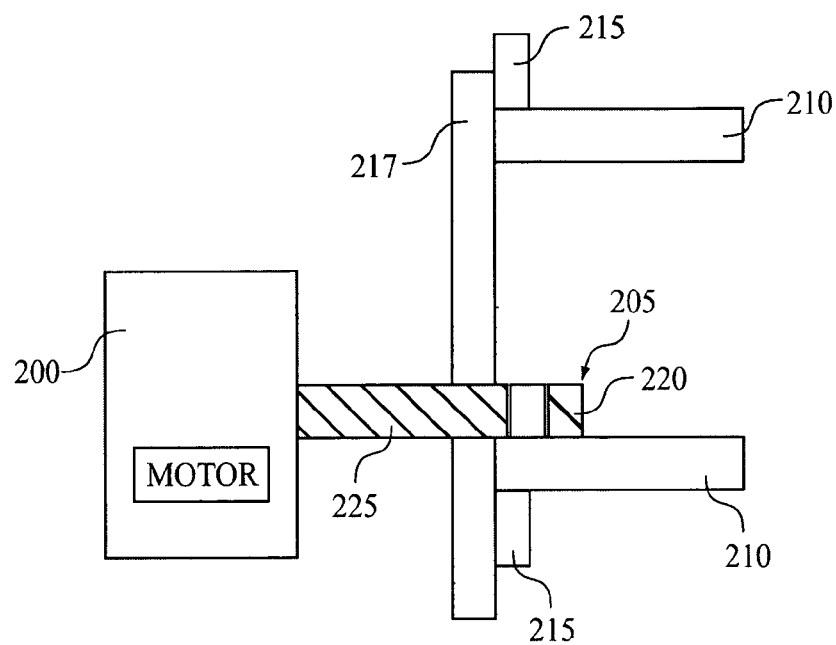
FIG. 4 details a lateral cutting device including the rotary bit cutting mechanism (FIG. 4A) and the device within the lateral (FIG. 4B)
Figure 4B:
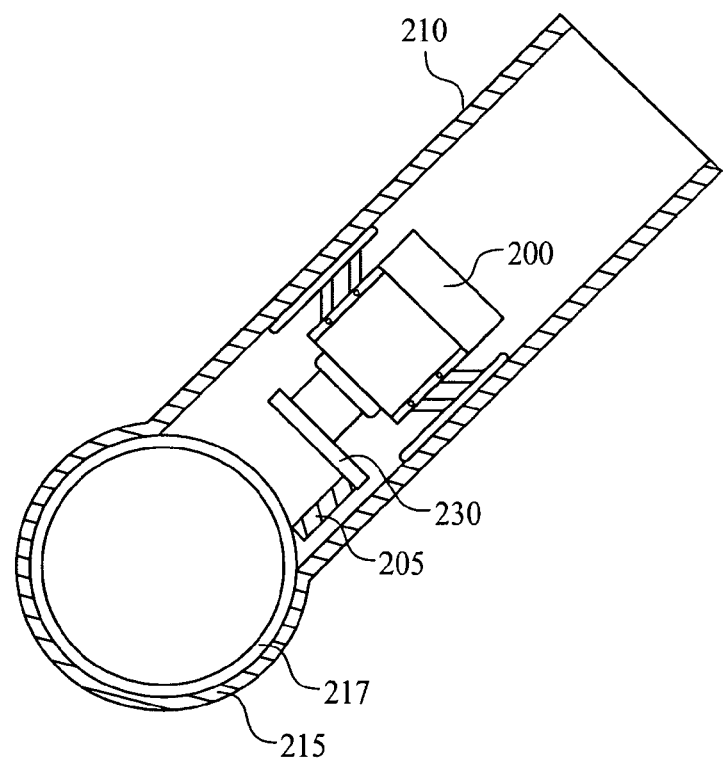

FIG. 4 shows one preferred embodiment of lateral cutting device 200 including a long end mill 205, akin to a router bit. Specifically, FIG. 4A shows the lateral cutting device 200 within a lateral 210 next to a main 215 with a liner 217, and FIG. 4B shows an enhanced view of the cutting process. The router bit 205 is powered by an onboard battery or other power source, and, once signaled, the bit rotates at a high speed. The bit 205 is capable of cutting on its "plunging" face 220 as well as on its edge (cutting flutes 225). Therefore, by allowing the router bit 205 to move in two directions perpendicular to the length of the lateral (across the face of the lined lateral) as well as allowing the router bit to extend out of the lateral cutting device, a complete hole can be made in the relined lateral.

In one embodiment, the router bit 205 has a spinning motion to facilitate cutting, an extension motion to plunge the bit through the lining, and a rotating arm 230 to allow the bit to rotate around the inner diameter of the lateral. Based on the geometry of the lateral-main intersection, the bit 205 will probably need to perform several rotations and incrementally cut through the lining at different angles. Because the lateral may meet the main at a 45-degree angle, the bit 205 preferably includes enough longitudinal movement (out from the lateral cutting device) to cut the lining at the far end of the intersection.

In another embodiment, the arm 230 includes a spring to bias the cutting bit 205 against the inner diameter of the lateral 210. In this way, when the arm 230 is rotated in a circle, the bit 205 will follow the inside diameter of the lateral 210 and cut the entire lateral open with one rotational sweep. However, additional rotations may be necessary to refine or clean up the final cut. Alternatively, a second bit, such as a rotating wire brush, may be used to finish the cut satisfactorily.

Figure 5:
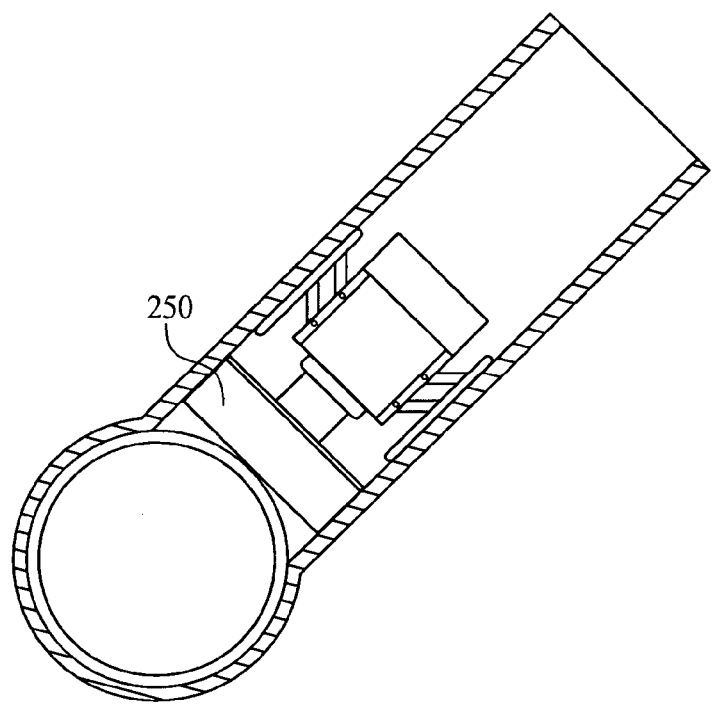
FIG. 5 shows a lateral cutting device with a saw blade cutting mechanism.

If the diameter of the lateral is known, a circular saw blade 250 (FIG. 5), grinding head 260 (FIG. 6) or other fixed cutting device may also be used, alone or in combination with a finishing bit. The advantage of this alternative is a clean, predictable cut without side-to-side motion of the cutting tool, but the size and weight of the saw blade 250 or grinding disc 260, as well as the unpredictable nature of the inside of lateral pipes may limit the use of this embodiment to only certain applications.

The saw blade 250 must be deep enough to completely cut through the CIPP without bottoming out. For laterals that are perpendicular to the main line, this is possible. For angled laterals, the depth of the saw blade 250 may be too great to allow the lateral device to be inserted into the lateral at all. The grinding disc 260, on the other hand, has the advantage that it removes all the material in front of it while cutting. A typical hole saw type blade 250 would require great depth to accomplish this cut. These fixed diameter cutting devices could be split and spring loaded radially outward to provide for a cut that is close as possible to the lateral diameter, in essence providing an automatically adjustable cutting diameter.

Figure 6:
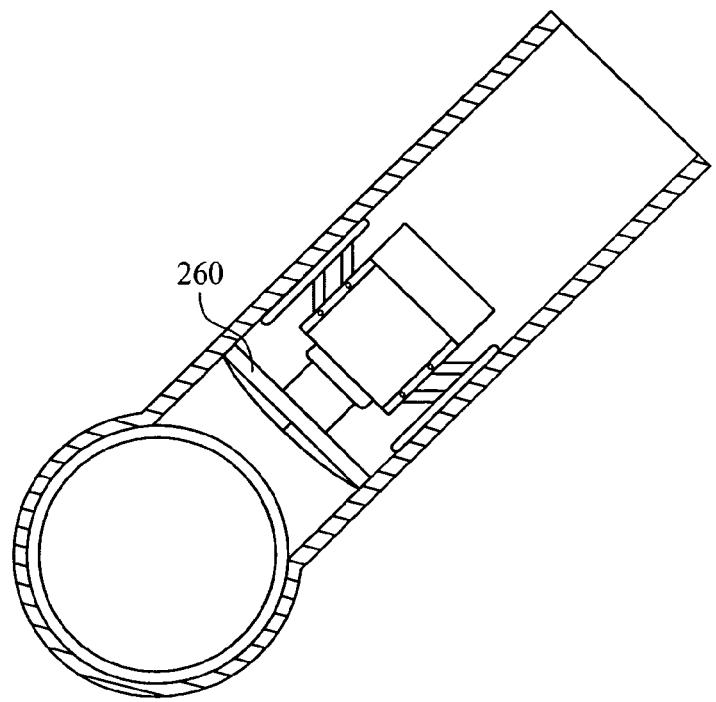
FIG. 6 shows a lateral cutting device with a grinding cutting mechanism.
Figure 7:
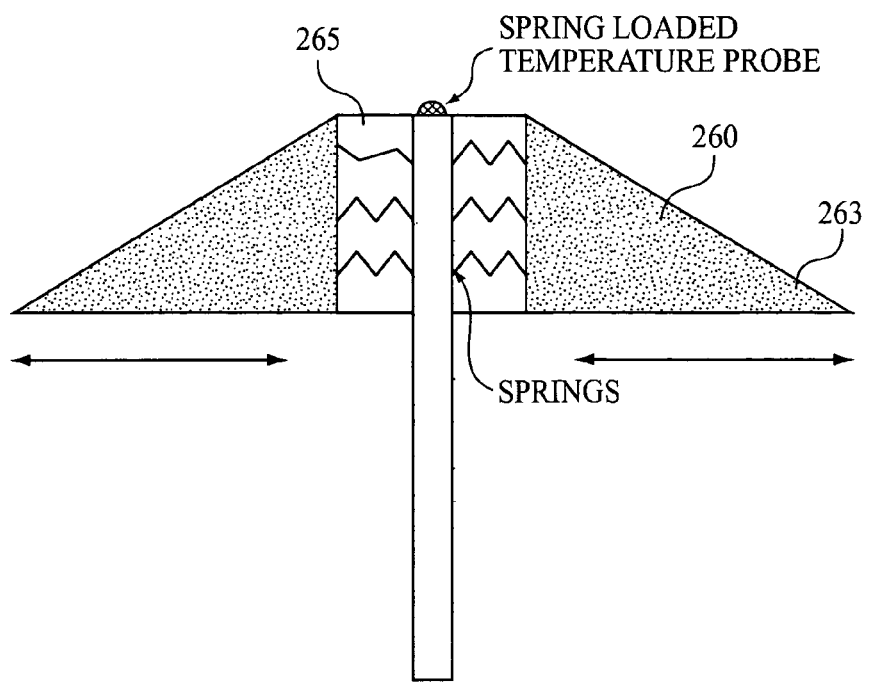
FIG. 7 depicts an automatically adjustable grinding bit.
Figure 8:
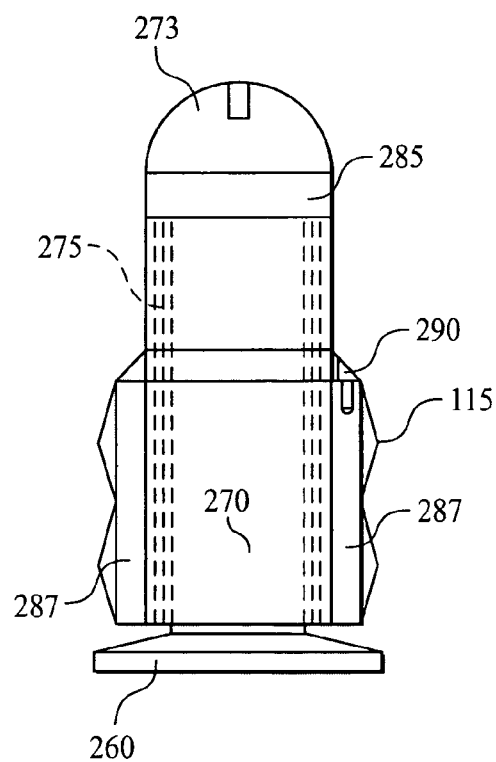
FIG. 8 depicts an exemplary grinding bit lateral cutting device.

The grinding head 260 of the FIG. 6 embodiment is shown in more detail in FIG. 7. The grinding head 260 is a thin disc with cutting features on the side 263 and face 265 of the disc. The cutting features may be cutting flutes, replaceable carbide blades, or embedded carbide flakes that provide a sharp and durable surface. As shown in FIG. 8, the cutting head 260 is preferably spun directly from the output of a drive motor 270 that could be air (compressor 273) or electric powered or powered by other means. The motor 270 is mounted in the inner most tube of a series of telescoping tubes 275 of increasingly larger diameter. The telescoping tubes 275 extend the cutting head 260 a large distance while minimizing the overall length when retracted. The tubes 275 are extended and retraced by air pressure or the retraction could be spring activated. Small air valves 285 in the device control the flow of air to the tubes. Air could be generated locally from a miniature air compressor 273 or the air could be stored on-board in a high-pressure chamber. A high volume of air can be stored at high-pressure then slowly released to control the extension and/or retraction of the tubes.

Preferably, two batteries 287 would power the system. One set of batteries 287 provides power for the cutting head 260 and air compressor 273. The other set of batteries 287 provides power for the on-board controller and receiver, air valves 285, and any other devices that may be required (including devices for lateral location).

The lateral cutting device would carry enough power to enable a long standby period and one complete lateral cut. The lateral device would likely require re-charging after each use. A charge port 290 on the device allows it to be dropped into a charging port similar to standard cordless drills. Operational data would be stored in memory on-board the lateral device for subsequent download. This information may be useful for troubleshooting, design improvements, and also collection of fees related to the number of cuts that are made with the device.

The controller is a computer that once switched on, begins to monitor for a signal to cut the lateral or provide other sensor data to the user. The controller runs software that makes the lateral device self-sufficient (a robot). In standby mode, the device lies dormant, waiting for a signal to begin cutting. The signal can be a wireless RF signal or an audible tone or a visible light. Any number of methods may be devised to trigger the lateral devices. The triggering can occur from above ground or from on-board a delivery device. Once the signal is sensed, the device enters a cutting mode and begins a sequence of operations that results in a successful cutting operation. By equipping the lateral device with a transmitter as well as receiver, the device can communicate current status, sensor (e.g., temperature) information, failure information or the like, enabling two way communication and a means for supervisory or semi-autonomous control modes.

As stated above, because the lateral cutting devices each are self-powered and perform their own cutting, they may be utilized simultaneously to cut many lateral holes at the same time. For example, even if each lateral cut took 30 minutes to cut, the fifteen lateral cuts in combination would also only take 30 minutes to cut. In this way, hours are taken off the total relining process time.

Although the above examples of use have all centered around cutting through a recently relined lateral in a sewer network, the present invention provides a broader range of functionality. For example, if any substantial blockage is located within any lateral, the lateral cutting device could be inserted into the upper (non-main) end of the lateral and work its way down to the blockage (under its own power or by imputed motion). At the blockage, the same techniques used to cut open the lateral could be used to cut through the blockage or otherwise remove the obstruction according to common practices.

Further, the power source is not limited to a simple battery and for larger and/or more powerful cutting tools, an alternative source such as a flexible drive shaft, fuel cell, onboard bottled compressed air or a small engine may be utilized.

Delivery Device

In order to haul the various lateral devices (both lateral location devices and lateral cutting devices) proximate to each lateral and to aid in the insertion of each lateral device into the lateral, a "delivery device" (acting as both lateral device carrier and insertion mechanism) is preferred. As stated above, two key issues with the delivery device pertain to carrying a sufficient number of lateral devices at a single time and accommodating the various angles at which laterals intersect with the main (see FIG. 1).

Figure 9A:
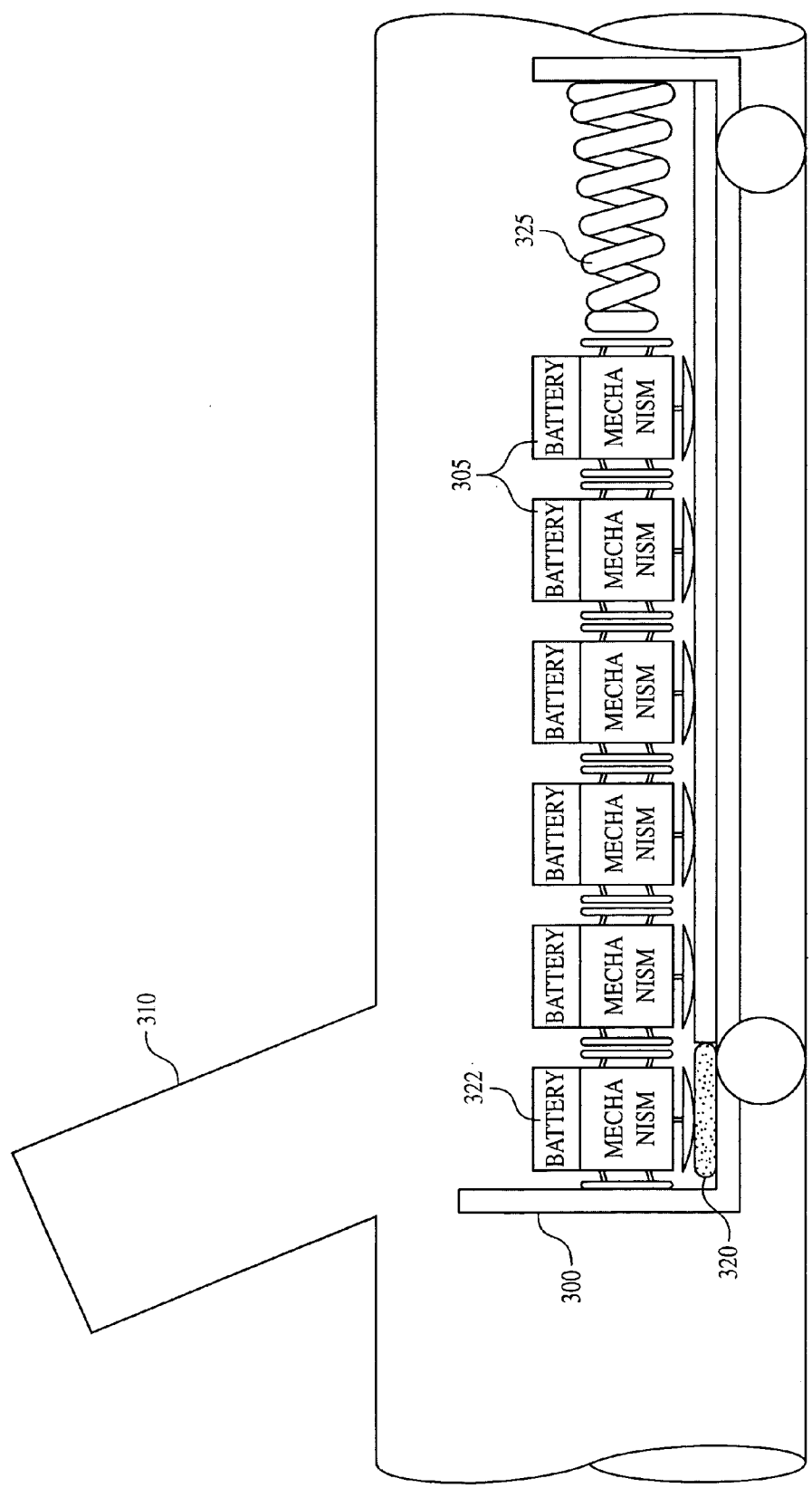
FIG. 9 shows one exemplary delivery device approaching (FIG. 9A) and at (FIG. 9B) a lateral.
Figure 9B:
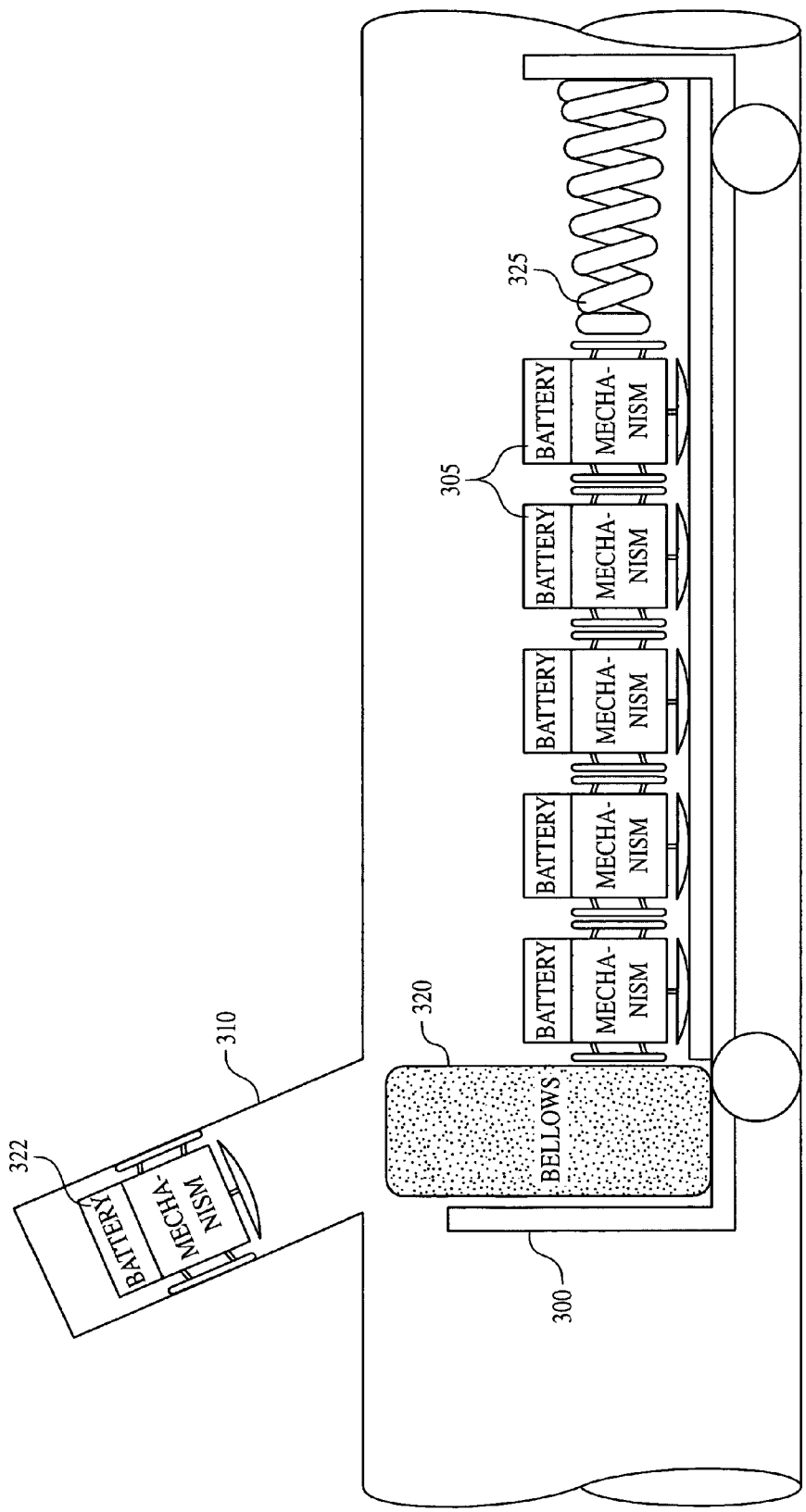

FIG. 9 details one embodiment of the delivery device 300 with a plurality of different lateral devices 305 (in this case lateral cutting devices) loaded thereon. FIG. 9A shows the delivery device 300 upon approach to an angled lateral 310, and FIG. 9B shows the delivery device 300 with bellows 320 activated to push a lateral cutting device 322 up and into the lateral 310.

In the FIG. 9 embodiment, the delivery device 300 is shown as a flatbed truck that moves on wheels. However, this powered wheeled device could be replaced with a variety of powered and passive means for moving the delivery device through the main. There is also a biasing device 325, shown as a spring, that forces the "next" lateral device 322 into a ready position on the deflated bellows 320 (FIG. 9A). Upon locating the next lateral, the bellows 320 is selectively inflated to impart an appropriate angle on the lateral cutting device 322 for insertion (FIG. 9B). An air bellows is preferred because of its low weight and extremely compact size when deflated.

Because the laterals may generally intersect with the main at any angle within the upper hemisphere of the main (FIG. 1), the bellows 320 are adjusted according to conventional practices to impart multiple degrees of freedom on the direction of lateral device insertion. These angles may be imparted by pneumatic "muscles" that are common in the art. Alternatively, the entire bellows actuator could be enclosed or partially enclosed in a tube (not shown). The tube is aimed via conventional actuators, and the bellows acts only as the force with which the lateral cutting device is pushed up and into the lateral. This "aim and shoot" embodiment is characterized by a simpler control mechanism when compared to the "muscle" control version.

Figure 10A:
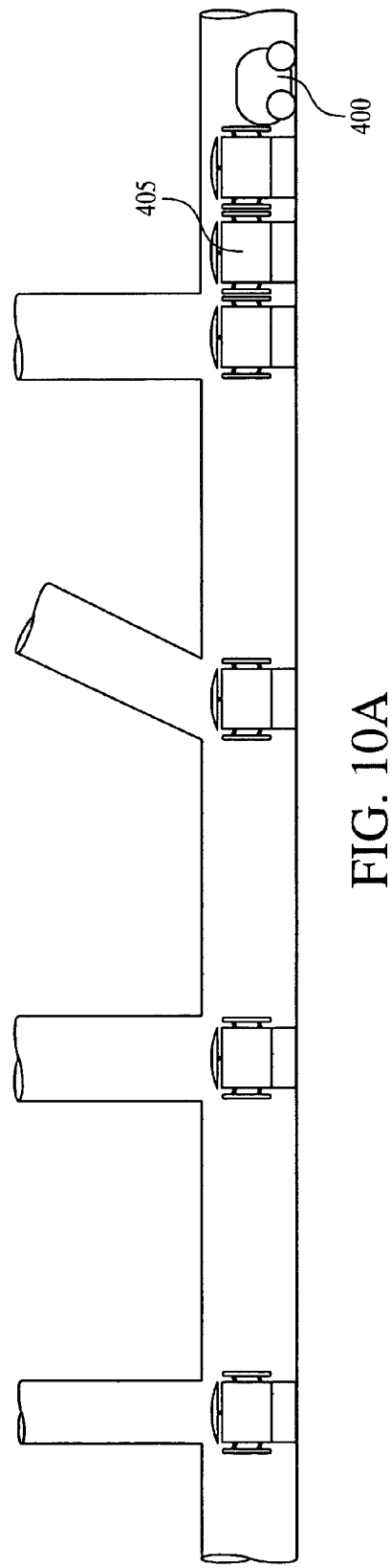
FIG. 10 shows an alternative delivery device before (FIG. 10A) and after (FIG. 10B) lateral device insertion.
Figure 10B:
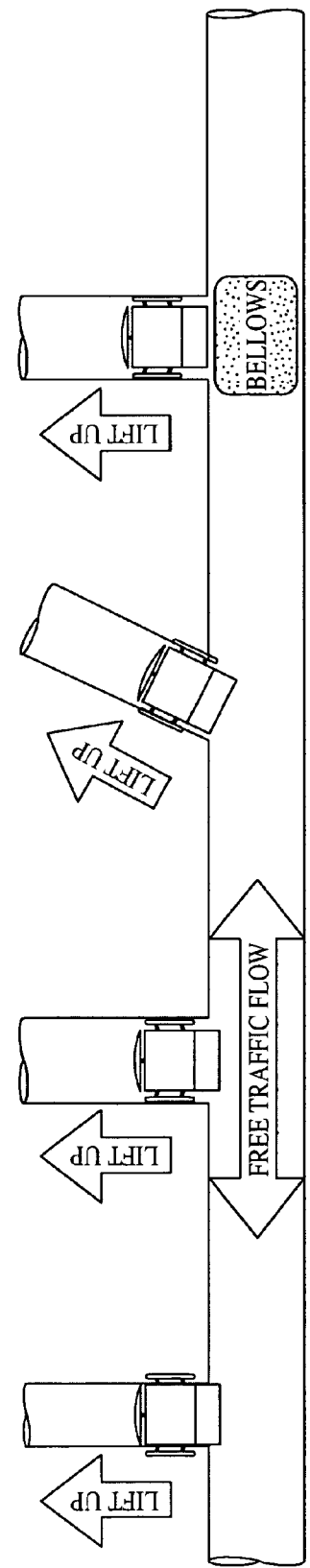

FIG. 10A shows an alternative lateral delivery device 400 in which the various lateral devices 405 (cutting and locator devices) are daisy-chained to each other and are pulled to successive lateral intersections by a truck 400 or tether (not shown). As shown in FIG. 10B, the lateral cutting devices 405 are capable of lifting themselves up into the lateral via the actuation of an extension tube and clamping mechanism. In this way, the main is clear for regular use or for other devices to move within the main while the lateral devices are up in the lateral (FIG. 10B).

As shown in FIG. 10, when each of the lateral cutting devices is capable of lifting itself up, these devices need not be in the lateral before curing. In other words, after cure, a delivery device 400 may drag a plurality of lateral cutting devices 405 and drop one off at the location of each lateral intersection. Then, in parallel, each of the lateral cutting devices can raise themselves up and cut through the relined lateral from the main (as opposed to from the lateral). If, after cutting, the lateral cutting device can secure itself within the lateral (FIG. 10B) then the main will be clear until the lateral cutting devices are picked up. If not, then the main will be partially blocked by the lateral cutting devices until they are picked up.

Lateral Relining Device

In another preferred embodiment, the delivery device could be adapted to actually reline the lateral pipe—a lateral relining device. One example of a lateral relining device 505 is shown in FIG. 11A. In the FIG. 11A embodiment, a lateral device 505 is perched on the bellows 503 of a conventional delivery device 500. Coupled to the rear of the lateral device (via a work tool) is a long combination of felt liner with epoxy and a hollow, deflated cylindrical balloon 510. The orientation is such that, when inflated, the cylindrical balloon will be within the center of the "tube-shaped" liner, and there will be a longitudinal hole through the inner portion of the liner/balloon combination. FIG. 12A shows the top end of the liner/balloon combination (away from the main), and FIG. 12B shows the lower end (towards the main).

Figure 11B:
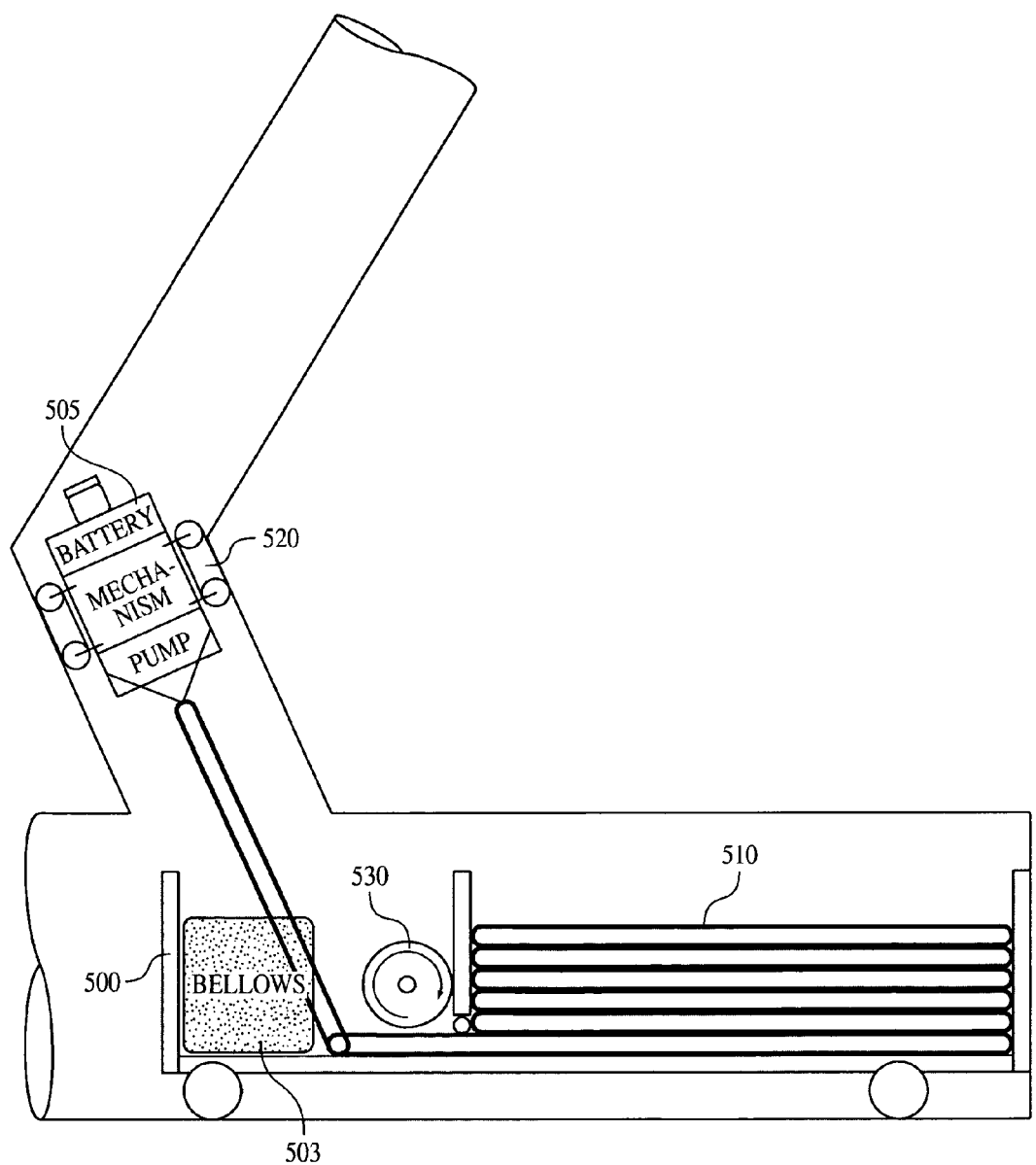
FIG. 11 shows a lateral relining robot including the process steps (FIGS. 1A–D,11F) and a cross-sectional view (FIG. 1E)
Figure 12A:
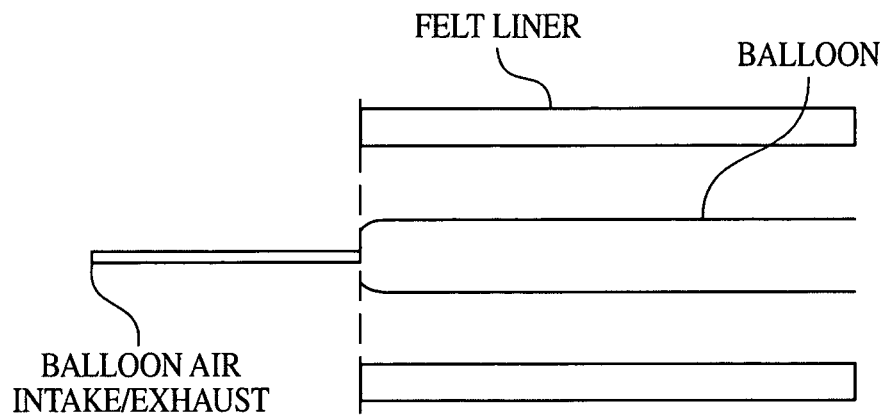
FIG. 12 shows a top (FIG. 12A) and bottom (FIG. 12B) of a lateral liner.
Figure 12B:
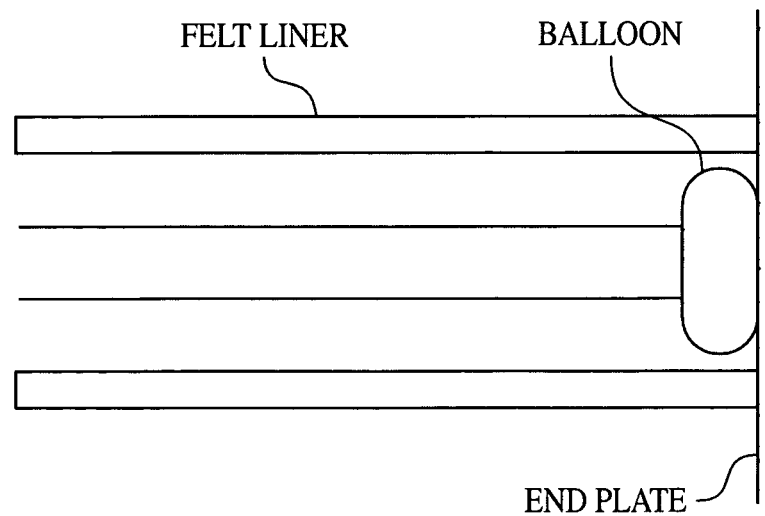
Figure 13B:
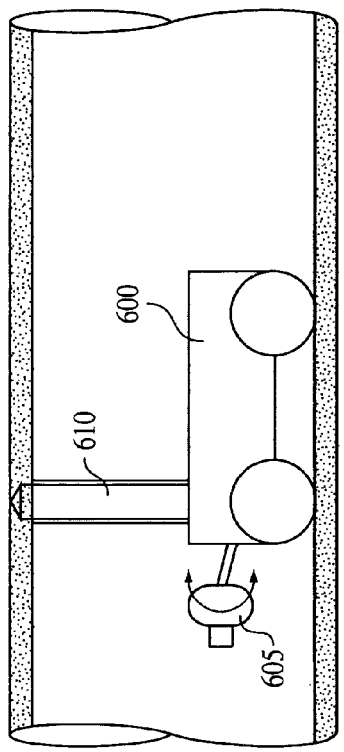
FIG. 13 shows a remote sampling robot with optional features (FIGS. 13A–D).
Figure 13D:
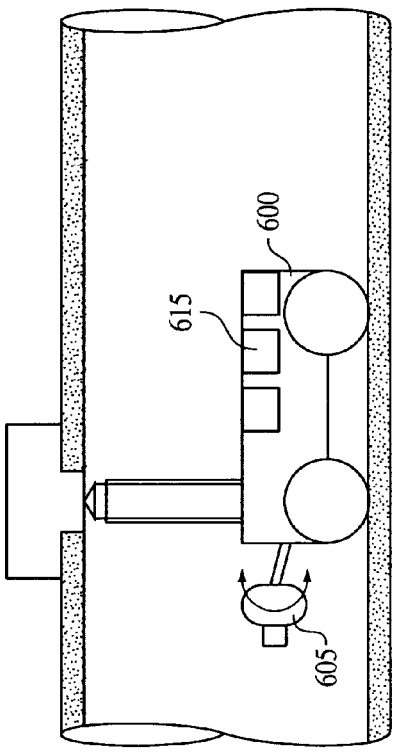
Figure 13A:
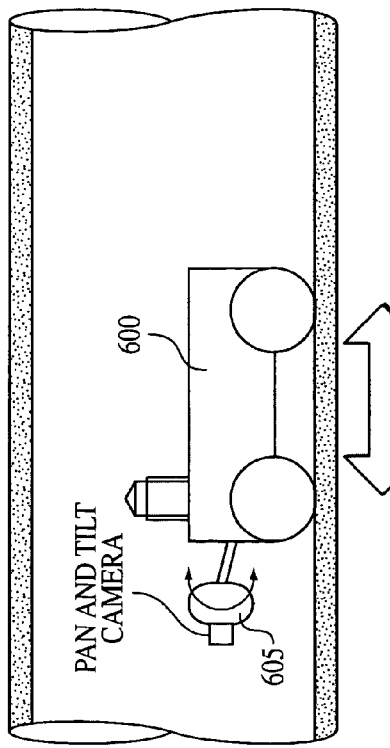
Figure 13C:
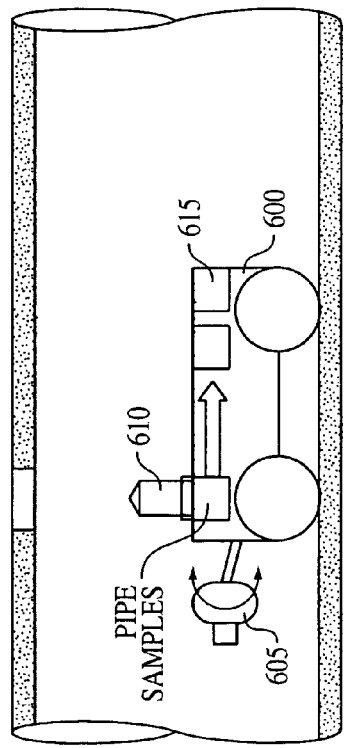

FIG. 11B shows the same lateral relining device 505 upon activation of the bellows 503 and insertion into the lateral. In this particular embodiment, the lateral device has outwardly biased treads 520 that hold the lateral device 505 within the inner diameter of the lateral against gravity and provide a means for the lateral device to crawl its way up the lateral toward the house or building at the upper end. As the lateral device 505 crawls up the lateral, the deflated but hollow balloon/liner combination 510 is dragged up the lateral too. Note in FIG. 11A that the folded balloon/liner combination 510 is aided by a plurality of rollers 530 or another guidance mechanism for ease of insertion.

Figure 11C:
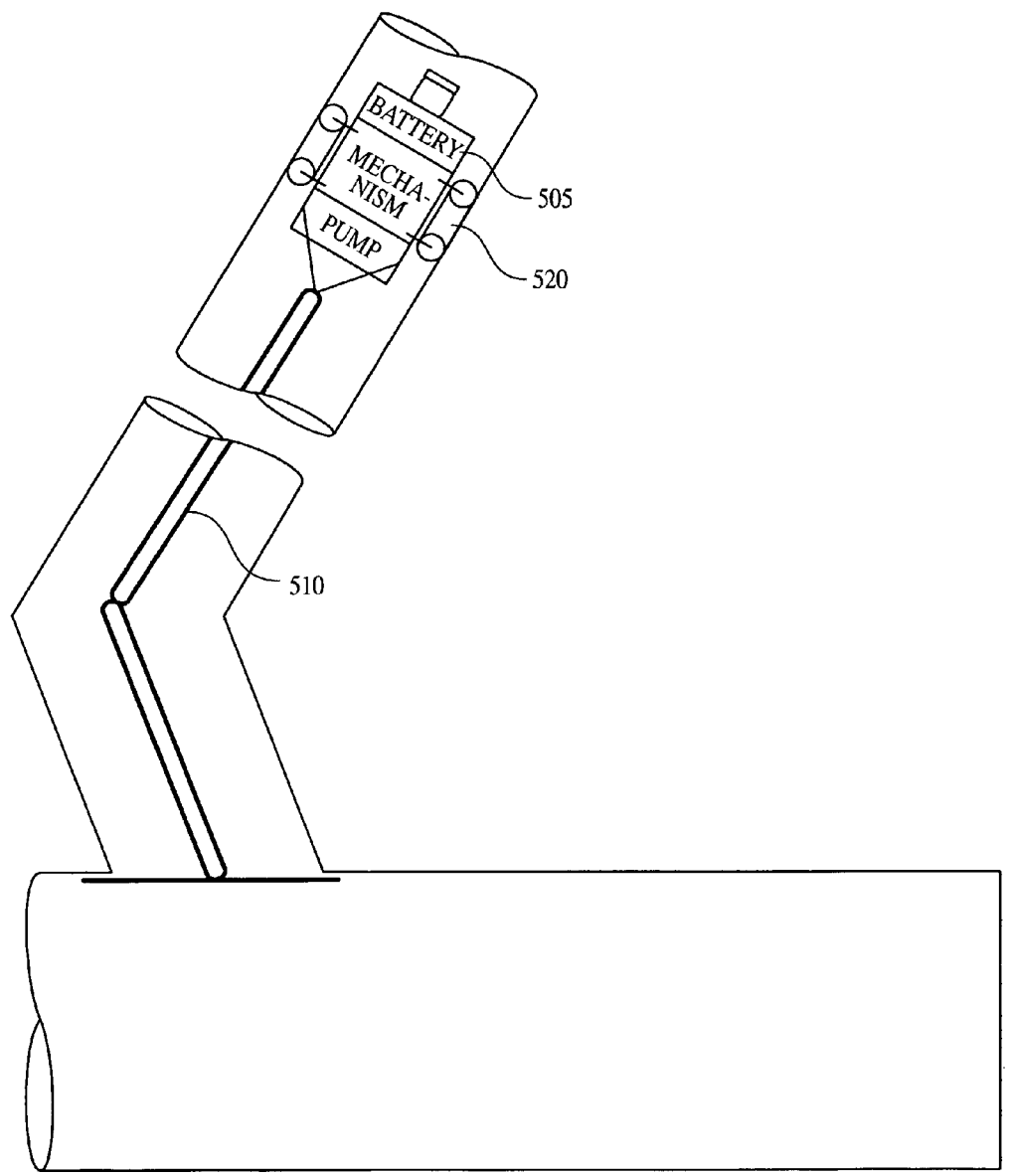
Figure 11D:
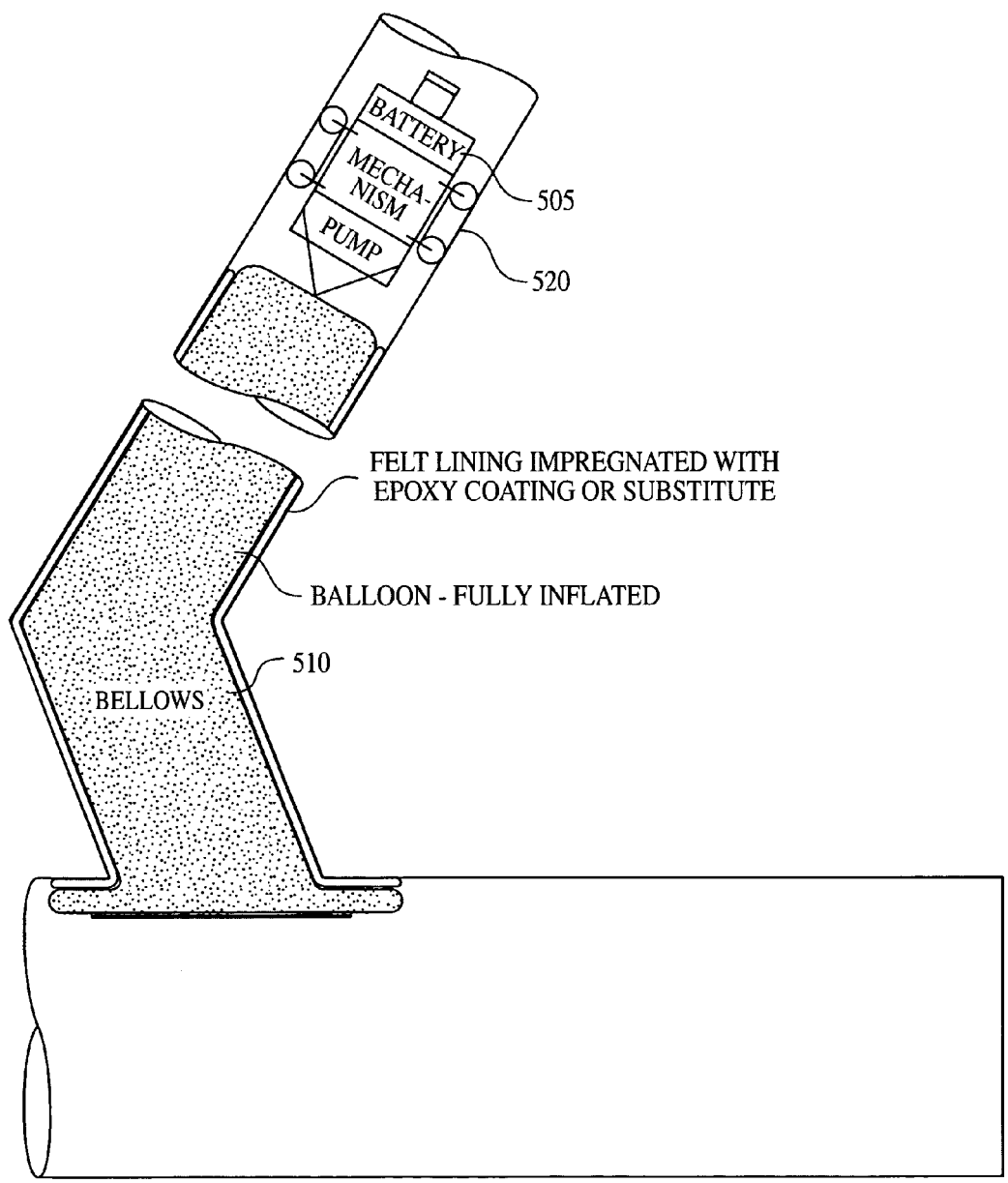

FIG. 11C details the lateral device 505 after negotiating a turn in the lateral. Likewise, the liner/balloon combination 510 is also pulled around this bend. Once in place, FIG. 11D shows the inflation of the cylindrical balloon within the lining. This inflation biases the lining against the walls of the lateral, and, if the balloon is filled with a hot liquid, causes the curing of the liner in place similar to that of the main lines described above. Note in the FIG. 11E cross section of the liner and balloon during inflation that there is a hollow section in the interior of the balloon, allowing the lateral to be in use (pass waste) during the relining process.

Figure 11F:
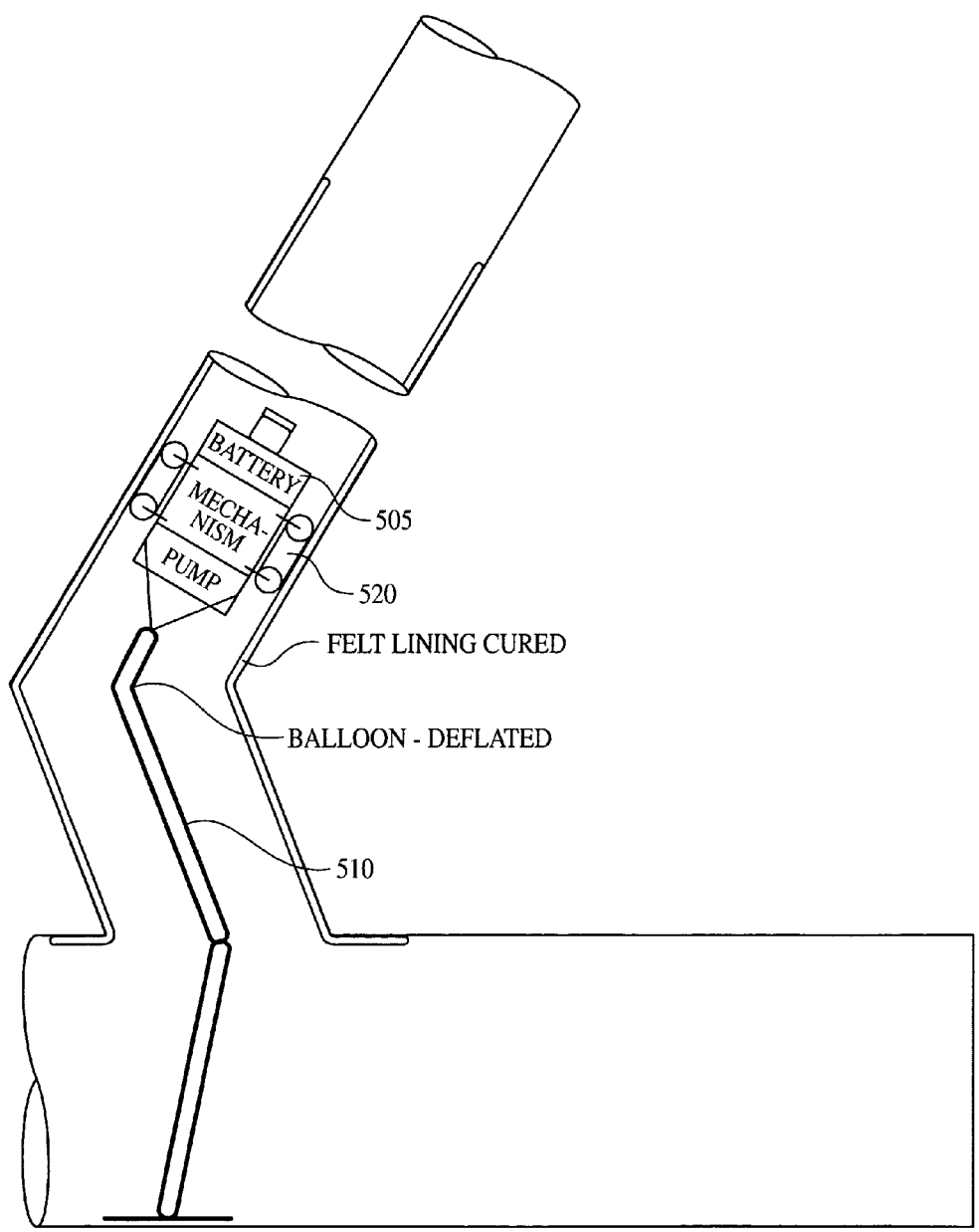

FIG. 11F shows the balloon after deflation and the lateral device 505 crawling back down to the lateral delivery device 500. Once at the lateral-main junction, an arm or other device from the delivery device mates with the lateral device and stores it back on the lateral delivery device.

In practice, other materials or items such as electric or fiber optic cabling for power or information transmission may be routed through the lateral connection using a similar method as described above. These would be considered one type of lateral inspection device (typically with treads or other mobility mechanism). While traveling up the lateral, the lateral device may include a means to affix cable, rehabilitation liners, rehabilitation sleeves, or other devices to the wall surface of the lateral pipe. These power and signal cables are sometimes integrated into the lining and may therefore be deployed by default during the re-lining process.

Inspection (Robot) Device

Both before and after the lining process, the main pipeline and all connected laterals are typically inspected and/or mapped to plan a relining project and to verify its completion. One embodiment of the present invention includes an inspection robot or semi-autonomous machine, herein called a device, which includes an onboard hard drive or other data storage device to store video from a camera as the inspection device traverses the interior region of the main. Additionally, the device may include one or more distance sensors that sweep the interior surface of the main and log device-to-surface distances in order to generate a three-dimensional (3D) map of the interior of the main and lateral pipes. This captured mapping data could also be used for navigation of the inspection device, for example using the open source mapping technology SLAM ("Simultaneous Location And Mapping Technology").

Prior art inspection systems are typically tethered to a control truck at the surface and are controlled by an operator at the truck. The inspection device of the present invention, however, is autonomous in nature and is preferably capable of capturing and storing data for periods of eight or more hours at a time. In this way, the inspection device may be inserted into a main line through a manhole and left to chart an extended portion of the main under its own mapping and guidance systems. During inspection, the device will encounter various waypoints, for example at each successive manhole, the inspection device may wirelessly transmit its current location to the surface for monitoring and eventual pickup of the inspection robot. At this point, the hard drive may be uploaded to the control truck, and the inspection robot may proceed on its next mapping and inspection run.

FIG. 13 shows an additional inspection and thickness-testing device 600 that may be employed with the present invention. This device 600 may include a pan and tilt camera 605 (FIG. 13A) and/or distance sensor as defined above. Additionally, the device may include a core sampler 610 capable of taking a core sample 615 out of a concrete or metal pipe (FIG. 13B), storing the sample 615 (FIG. 13C) within the device 600, and thereafter filling the pipe with grout or other materials to reseal the pipe (FIG. 13D). These core samples may be stored on the inspection robot for future testing at the surface.

In sum, a single lateral device could be adapted to perform the location, cutting, inspection, relining and other work functions within a lateral pipe. In general, the features necessary to carry out these functions are referred to as "work tools" (electrically generated signal sources, cutters, relining anchors, inspection cameras, core samplers, etc.) for performing these various work functions (location, cutting, inspection, relining, etc.).

In a similar fashion and method as described with lateral cutting, multiple inspection moles may be released to the entrance of a lateral, the moles may travel up the lateral pipe to perform inspection. This enables two or more lateral pipes to be inspected simultaneously in one main pipe section. As described in the above section the inspection moles can record the inspection data and/or distance data as the mole travels up and down the pipe. That information is saved and downloaded for later use. Additionally, data may be transmitted wirelessly or though a connected tether for real-time remote monitoring of the moles and work performed.

In a similar fashion and method as described with lateral cutting, multiple work moles may be released to the entrance of a lateral, the moles may travel up the lateral pipe to perform work such as laying cable or placing sensors used to monitor flow or other characteristics of the surrounding environment including but not limited to temperature, chemistry, radiation, and sound. This enables two or more lateral pipes to be worked simultaneously in one main pipe section. As described above, the work moles can record various data and/or distance data as the mole travels up and down the pipe. That information is saved and downloaded for later use. Additionally, data may be transmitted wirelessly or though a connected tether for real-time remote monitoring of the moles and work performed.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A method for performing untethered work in at least one of a plurality of lateral pipes connected to a main pipe, comprising the steps of:
    loading a lateral device into at least one lateral pipe from the main pipe;
    anchoring said lateral device to the at least one lateral pipe;
    utilizing said lateral device to perform untethered work on or within the at least one lateral pipe, the power necessary to perform said work being supplied from onboard said lateral device anchored within said lateral; and
    unloading said lateral device from the at least one lateral pipe to the main pipe.

2. An untethered lateral device, comprising:
    an untethered lateral device housing;
    an anchor device to secure said housing to an inner wall of a lateral pipe which intersects with a main pipe;
    a work tool; and
    a local power supply and local control circuitry onboard said lateral device to provide untethered power to said work tool and untethered control of said work tool.

3. The lateral device of claim 2, wherein said work tool is a rotary bit cutting tool.

4. The lateral device of claim 3, wherein a rotating arm supporting said rotary bit cutting tool is spring biased against the inner wall of the first pipe.

5. The lateral device of claim 2, wherein said work tool is a hole saw cutting tool.

6. The lateral device of claim 2, wherein said work tool is a grinding device cutting tool.

7. The lateral device of claim 6, wherein said grinding device includes spring tensioning that automatically adjusts a cutting diameter of the grinding device to the size of the inside wall of the first pipe.

8. The lateral device of claim 2, wherein said work tool is an electrically generated signal source.

9. The lateral device of claim 2, wherein said work tool is an attachment adapted to drag a liner up into said first pipe from the second pipe.

10. The lateral device of claim 2, wherein a state of said work tool is determined based on local decision-making from on board the lateral device.

11. A lateral device for performing untethered work within at least one of a plurality of lateral pipes that intersect with a main pipe in a pipeline network, comprising:
    an untethered lateral device housing;
    an anchor device to secure said housing to an inner wall of said one of a plurality of lateral pipes; and
    a work tool that is powered and controlled from onboard said lateral device by a local untethered power supply and local untethered control circuitry, respectively.

12. The lateral device of claim 11, wherein said work tool is a rotary bit cutting tool.

13. The lateral device of claim 12, wherein a rotating arm supporting said rotary bit cutting tool is spring biased against the inner wall of the first pipe.

14. The lateral device of claim 11, wherein said work tool is a hole saw cutting tool.

15. The lateral device of claim 11, wherein said work tool is a grinding device cutting tool.

16. The lateral device of claim 15, wherein said grinding device includes spring tensioning that automatically adjusts a cutting diameter of the grinding device to the size of the inside wall of the first pipe.

17. The lateral device of claim 11, wherein said work tool is an electrically generated signal source.

18. The lateral device of claim 11, wherein said work tool is an attachment adapted to drag a liner up into said first pipe from the second pipe.

19. The lateral device of claim 11, wherein a state of said work tool is determined based on local decision-making from on board the lateral device.

* * * * *